(12) United States Patent
Irzyk

(10) Patent No.: US 10,181,308 B2
(45) Date of Patent: Jan. 15, 2019

(54) SYSTEM AND METHOD FOR CONTROLLING THE LUMINOSITY OF A HEAD-UP DISPLAY AND DISPLAY USING SAID SYSTEM

(71) Applicant: VALEO COMFORT AND DRIVING ASSISTANCE, Creteil (FR)

(72) Inventor: Michael Irzyk, Creteil (FR)

(73) Assignee: VALEO COMFORT AND DRIVING ASSISTANCE, Creéteil (FR)

( * ) Notice: Subject to any disclaimer, the term of this patent is extended or adjusted under 35 U.S.C. 154(b) by 0 days.

(21) Appl. No.: 15/104,293

(22) PCT Filed: Dec. 18, 2014

(86) PCT No.: PCT/FR2014/000287
§ 371 (c)(1),
(2) Date: Jun. 14, 2016

(87) PCT Pub. No.: WO2015/092164
PCT Pub. Date: Jun. 25, 2015

(65) Prior Publication Data
US 2017/0004805 A1  Jan. 5, 2017

(30) Foreign Application Priority Data
Dec. 20, 2013  (FR) .................................... 13 03044

(51) Int. Cl.
*G09G 5/10* (2006.01)
*G02B 27/01* (2006.01)

(52) U.S. Cl.
CPC .......... *G09G 5/10* (2013.01); *G02B 27/0101* (2013.01); *G02B 2027/014* (2013.01);
(Continued)

(58) Field of Classification Search
CPC ... G09G 2320/0233; G09G 2320/0626; G09G 2360/14; G09G 2360/141;
(Continued)

(56) References Cited

U.S. PATENT DOCUMENTS

| 3,816,005 A | 6/1974 | Kirschner |
| 2010/0066925 A1* | 3/2010 | Nagahara ............... G02B 27/01 349/11 |

(Continued)

FOREIGN PATENT DOCUMENTS

| EP | 2 093 603 A1 | 8/2009 |
| KR | 20120123833 A | 11/2012 |
| WO | 2011/015843 A2 | 2/2011 |

OTHER PUBLICATIONS

International Search Report issued in PCT/FR2014/000287 dated Mar. 19, 2015 (3 pages).
(Continued)

*Primary Examiner* — Jason Mandeville
(74) *Attorney, Agent, or Firm* — Osha Liang LLP

(57) ABSTRACT

The invention relates to a system for controlling the luminosity of a head-up display (36) of a vehicle, said display (36) being configured to display an image, said system comprising means (32) for assessing luminosity connected to means (34) for determining a luminosity instruction for the display (36). The system is characterized in that said means (32) for assessing luminosity are capable of assessing the external luminosity towards the front of the vehicle and beyond the image displayed on said display (36), and in that said determination means (34) are capable of determining the luminosity instruction in accordance with the external luminosity assessed and of transmitting same to the display (36).

13 Claims, 1 Drawing Sheet

Figure 1:
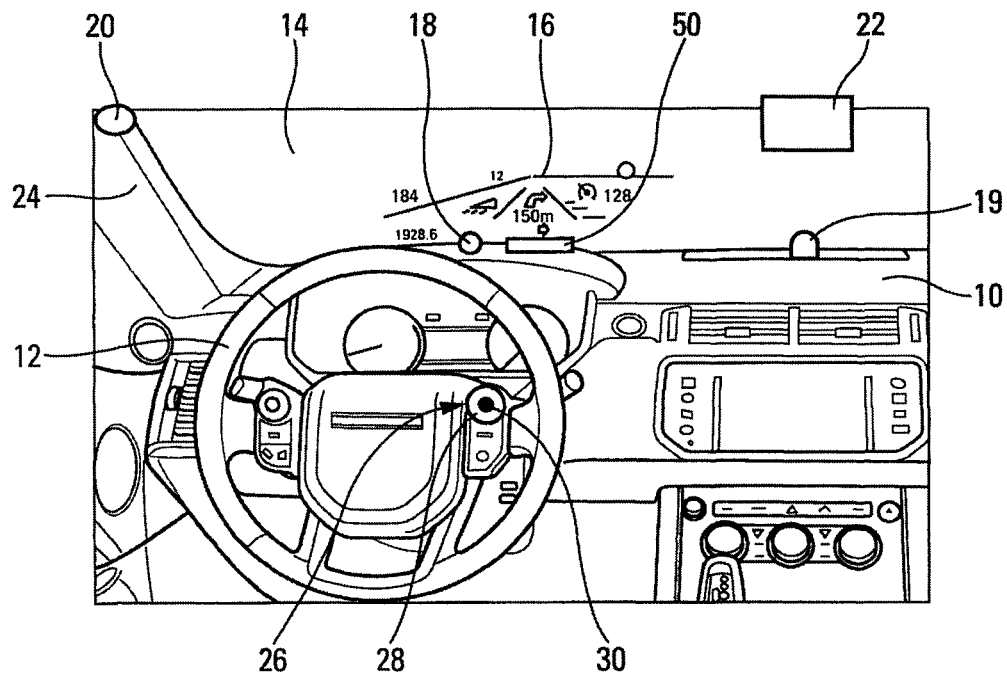

(52) U.S. Cl.
CPC ............... *G02B 2027/0118* (2013.01); *G02B 2027/0154* (2013.01); *G09G 2320/0626* (2013.01); *G09G 2360/144* (2013.01); *G09G 2360/145* (2013.01)

(58) Field of Classification Search
CPC ......... G09G 2360/144; G09G 2380/10; G02B 2027/0118; G02B 2027/0183; G02B 27/017; B60R 2300/205
USPC ................................... 345/7–9, 207, 214, 77
See application file for complete search history.

(56) References Cited

U.S. PATENT DOCUMENTS

| | | | | |
|---|---|---|---|---|
| 2010/0321170 A1* | 12/2010 | Cooper | ............. | G02B 27/01 340/425.5 |
| 2011/0035099 A1* | 2/2011 | Kobayashi | ............. | B60K 35/00 701/36 |
| 2011/0102483 A1* | 5/2011 | Kanamori | ............. | G09G 3/002 345/690 |
| 2012/0050139 A1* | 3/2012 | Wang | ............. | G02B 27/01 345/7 |
| 2012/0092315 A1 | 4/2012 | Niemann et al. | | |
| 2012/0224060 A1* | 9/2012 | Gurevich | ............. | B60R 1/00 348/148 |
| 2014/0333647 A1* | 11/2014 | Lee | ............. | G02B 27/0179 345/589 |
| 2015/0168720 A1* | 6/2015 | Oh | ............. | B60R 1/00 345/690 |

OTHER PUBLICATIONS

Written Opinion of the International Searching Authority issued in PCT/FR2014/000287 dated Mar. 19, 2015 (5 pages).

\* cited by examiner

SYSTEM AND METHOD FOR CONTROLLING THE LUMINOSITY OF A HEAD-UP DISPLAY AND DISPLAY USING SAID SYSTEM

1. TECHNICAL FIELD OF THE INVENTION

The invention relates to a brightness control system for a head-up display.

2. TECHNOLOGICAL BACKGROUND

The invention will be applicable, for example, in motor vehicles for informing the users of the vehicle, in particular the driver thereof.

It is known practice to equip a motor vehicle with a display system, called head-up display. Such a system is placed in the field of view of the motor vehicle driver and displays information concerning the state of the motor vehicle, of the traffic or the like.

In order to avoid disturbing the driving, it is essential for the brightness of the projected image to be adapted to the ambient brightness. It is in particular necessary for the optical power of the projected image to differ greatly in a diurnal journey and in a night-time journey or upon passing into a tunnel. Thus, the brightness of the projected image has to be both visible in all circumstances and not objectionable, in both cases notably for safety reasons. Furthermore, given the significant brightness dynamic range necessary for observing these constraints, the management of the brightness must not be done only by the driver and must therefore be automated, adapting to the current situation of the vehicle.

Thus, it has been proposed to detect the ambient brightness using a brightness sensor installed on the vehicle. This brightness measurement is then used to adapt the brightness of the display. Such a system is for example presented in the patent application KR20120123833. Nevertheless, this solution is unsatisfactory in terms of safety since the information recorded by the sensor is imprecise, and can easily be wrong in case of external disturbances (headlights of an oncoming vehicle, town street lamps, etc.).

3. OBJECTIVES OF THE INVENTION

The invention aims to mitigate at least some of the drawbacks of the known head-up display brightness control systems.

In particular, the invention aims to provide, in at least one embodiment of the invention, a head-up display brightness control system that improves the security of the driver of the vehicle.

The invention aims also to provide, in at least one embodiment of the invention, a head-up display brightness control system that improves the comfort of the driver of the vehicle.

4. SUMMARY OF THE INVENTION

To do this, the invention relates to a brightness control system for a head-up display of a vehicle, said display being configured to display an image, said system comprising means for assessing brightness linked to means for determining a brightness setpoint intended for the display, characterized in that said means for assessing brightness are capable of assessing the external brightness toward the front of the vehicle and beyond the image displayed on said display, and in that said determination means are capable of determining the brightness setpoint as a function of the assessed external brightness and of transmitting it to the display.

A system according to the invention therefore makes it possible to anticipate the changes of brightness which are commonplace in a moving vehicle. These changes of brightness have to be taken into account as early as possible by the system, for the brightness setpoint transmitted to the display to be adapted to the coming situation, rather than to the present situation because that will create a delayed modification of the setpoint. The means for assessing brightness detect the brightness in front of the vehicle and beyond the image displayed on the display in order to make it possible for the determination means to determine the brightness setpoint in advance, and apply it at the moment when the brightness changes at the level of the display.

For example, during a night-time drive, the assessment means detects the brightness corresponding to an illuminated tunnel in front of the vehicle and beyond the image displayed on the display, and the brightness control system transmits to the display a brightness setpoint suited to the illuminated tunnel (in this case, a stronger brightness value than for the night-time drive), and applies it as soon as the vehicle enters into the illuminated tunnel.

Advantageously, and according to the invention, the means for assessing brightness comprise at least one brightness sensor.

According to this aspect of the invention, the brightness is directly measured notably by one or more brightness sensors.

Advantageously and according to this last aspect of the invention, the means for assessing brightness comprise an external brightness sensor capable of assessing the brightness toward the front of the vehicle and beyond the image displayed on the display, said sensor being arranged so as to be in the same field of view as the display.

According to this aspect of the invention, a sensor is directed directly toward the outside of the vehicle so as to pick up the brightness in the field of view of the driver beyond the display, to be able to adapt the brightness of the display to the external brightness beyond the display.

Advantageously and according to this last aspect of the invention, the external brightness sensor is arranged so as to receive the incident light in a cone whose intersection with the plane of the image covers substantially all of this image. Preferably, this cone has an angle of approximately 10°.

Advantageously and according to the invention, the means for assessing brightness comprise at least:
- the external brightness sensor, measuring the brightness outside the vehicle,
- a brightness sensor measuring the brightness inside the vehicle,
- a brightness sensor measuring the brightness of the display.

According to this aspect of the invention, these three brightnesses are used for the determination of the brightness setpoint: the brightness sensor of the display determines the current brightness of the display, the brightness sensor inside the vehicle makes it possible to measure the current ambient brightness at the level of the driver, the brightness sensor outside the vehicle makes it possible to measure in advance the brightness to which the vehicle will be subjected.

Advantageously and according to the invention, the means for assessing brightness are linked to means supplying one or more of the following types of data:
- absence/presence of rain,
- geolocation,
- time of day,
- weather conditions,
- video images,
- speed of the vehicle.

According to this aspect of the invention, the brightness is assessed as a function of the data supplied by a multitude of systems for measuring or picking up data. These data influence the assessment of the brightness and the determination of the brightness setpoint transmitted to the display. In particular, the absence/presence of rain, the weather conditions and the time of day influence the outside brightness. The geolocation notably makes it possible to predict the presence of tunnels and of town lighting. The video images notably give information on the brightness at a number of points of the field of view of the driver, on the state of the traffic, etc. Finally, the speed of the vehicle notably makes it possible to assess the time separating the vehicle from the anticipated change of situation.

Advantageously and according to the invention, the system comprises an illumination scene database, said base comprising data representative of different illumination situations. Advantageously, the system can feed said database through learning.

According to this aspect of the invention, the means for determining brightness can correlate the data recorded with known illumination situations, in order to deduce therefrom a suitable brightness setpoint. The system can also learn from existing situations to refine the data in its database.

Advantageously and according to the invention, the system comprises a manual brightness adjustment means capable of being controlled by the driver of the vehicle, and configured to allow a fine adjustment by a driver of the brightness setpoint transmitted to the display around the initial brightness setpoint value transmitted by the determination means.

According to this aspect of the invention, the automatic determination of the brightness setpoint has added to it a manual adjustment by the driver, making it possible to vary the point of comfort of the driver, that is to say a brightness which better corresponds to the optical/visual response specific to each driver. This adjustment is a fine adjustment, that is to say that moves away only slightly from the automatically determined setpoint. In other words, the brightness setpoint L transmitted to the display takes the form:

$$L = L_{auto} + \Delta l$$

with $L_{auto}$ being the brightness determined automatically by the determination means, and $\Delta l$ being the value of the fine adjustment by the driver. The fine adjustment value $\Delta l$ can advantageously be proportional to $L_{auto}$.

Advantageously and according to this last aspect of the invention, the manual adjustment means comprises a switch configured to, following the activation thereof by the driver, significantly reduce the brightness setpoint value and/or reduce the quantity of information displayed on the image of the display and, following the deactivation thereof, restore the initial brightness setpoint value and the quantity of information displayed on the image of the initial display.

According to this aspect of the invention, the switch allows the driver to use a discrete presence mode for the image displayed by the display, in order to reduce the significance thereof in the field of view of the driver, both in terms of brightness and in terms of quantity of information displayed.

The invention relates also to a head-up display comprising a brightness control system according to the invention.

The invention relates also to a method for controlling brightness of a head-up display of a vehicle, said display being configured to display an image, characterized in that said method comprises a step of assessment of the external brightness toward the front of the vehicle and beyond the image displayed on said display, a step of determination of a brightness setpoint for the display as a function of the external brightness assessed in the assessment step, and a step of transmission of said setpoint to said display.

The system according to the invention advantageously implements the method according to the invention. The method according to the invention is advantageously implemented by the system according to the invention.

5. DESCRIPTION OF THE FIGURES

Figure 2:
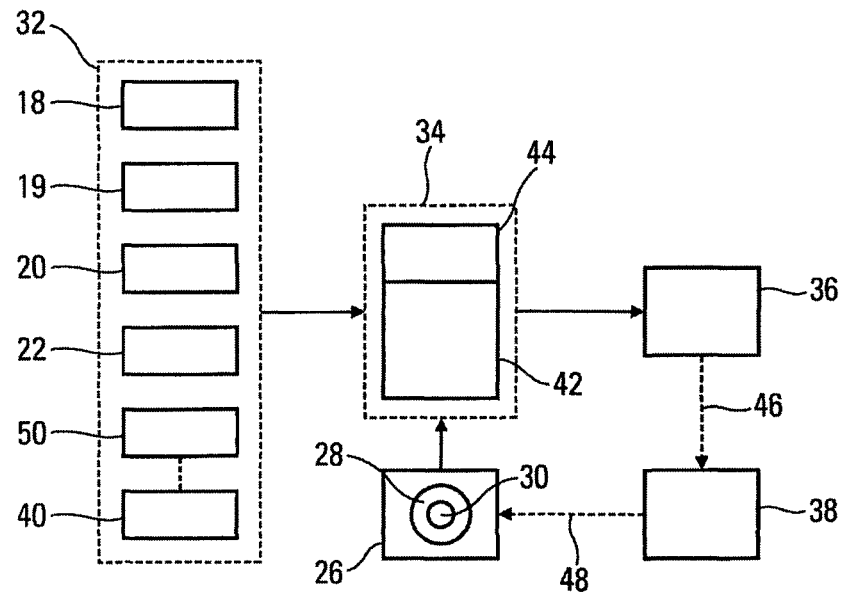

Other aims, features and advantages of the invention will become apparent on reading the following description given purely in a nonlimiting manner and which refers to the attached figures in which:

FIG. 1 is a schematic view of the interior of a vehicle equipped with a control system and a display according to the invention, FIG. 2 is a schematic representation of the control system according to the invention.

6. DETAILED DESCRIPTION OF AN EMBODIMENT OF THE INVENTION

FIG. 1 schematically represents a view of the interior of a vehicle equipped with a control system and a display according to the invention. The interior view represented shows a part of the field of view of a driver of the vehicle, notably a part of a vehicle interior, a dashboard 10, a steering wheel 12 and a windshield 14. By reflection on the windshield 14, there is displayed, by virtue of a display according to the invention of head-up display type, an image 16, comprising, for example, the speed of the vehicle, GPS guidance information and other information deemed useful by the constructor of the vehicle and/or the driver. The image 16 is a virtual image formed by an optical system such as, for example, a semi-reflecting plate. In this embodiment, the image 16 is directly formed on the windshield 14, but the display can also comprise, as is known, a semi-reflecting plate placed between the windshield 14 and the driver, in his or her field of view, on which the image 16 is formed.

The display according to the invention comprises a brightness control system according to the invention, described in more detail hereinbelow with reference to FIG. 2. The control system notably comprises means for assessing brightness. FIG. 1 shows, among the means for assessing brightness and by way of example, a first, external brightness sensor 18, a second, external brightness sensor 19, an internal brightness sensor 20 and a camera 22. The display also comprises a sensor 50 of the brightness of the displayed image 16.

The internal brightness sensor 20 measures the light in the vehicle, in proximity to the driver. It is advantageously situated on a perimeter 24 of the windshield 14 and is directed toward the driver. This internal brightness sensor 20 can form part of an assembly monitoring the driver, for example comprising an internal camera.

The function of the first, external brightness sensor 18 is to make it possible to assess the brightness toward the front of the vehicle, beyond the image 16 displayed on the head-up display. It comprises, for example, a photodetecting diode and an optical system, arranged so as to be in the same field of view as the display and for example make it possible to receive the incident light in a cone of angle for example of approximately 10°, whose intersection with the plane of the image 16 covers substantially all that image. This sensor 18 can also be a camera and can, if necessary, be used for other functions (detection of pedestrians, vehicles, etc.).

The second, external brightness sensor 19 is advantageously arranged on the dashboard 10 of the vehicle and directed toward the outside, for example upward. This external brightness sensor 19 can, for example, take the form of a photodetecting diode placed under a translucent dome, thus making it possible to measure a diffuse light. Such a dome makes it possible not to be subject to changes of brightness due to one-off external disturbances which would falsify the measurement performed.

The camera 22 placed on the windshield 14 and directed toward the outside makes it possible to obtain a video image, which can make it possible to recover a multitude of data, such as, for example, the brightness, the state of the traffic, etc.

FIG. 1 also shows a manual adjustment means 26 for the driver of the vehicle. This manual adjustment means 26 is advantageously placed in proximity to the driver, for example, here, in proximity to the steering wheel 12. The manual adjustment means 26 represented in FIG. 1 comprises a rotary thumbwheel 28 for manually adjusting the brightness and a switch 30, the rotary thumbwheel 28 surrounding the switch 30 which here takes the form of a pushbutton.

FIG. 2 schematically represents the control system according to the invention. The control system represented comprises means 32 for assessing brightness, means 34 for determining a brightness setpoint, the manual adjustment means 26, and the display 36. FIG. 2 also represents the interactions with the driver 38.

The means 32 for assessing brightness comprise, for example, the first external brightness sensor 18, the second external brightness sensor 19, the internal brightness sensor 20, the brightness sensor 50 measuring the brightness displayed by the display 36 and the camera 22 described with reference to FIG. 1. According to the embodiment, the means 32 for assessing brightness are also linked to means supplying one or more of the following types of data:
  absence/presence of rain, for example by virtue of a sensor of rain-light-temperature (RLT) type,
  geolocation, for example using a geolocation system such as the GPS (Global Positioning System) system,
  time of day, for example using an internal clock or, for more accuracy, a clock synchronized by a system such as the GPS,
  weather conditions, for example by the RLT sensor, or by recovery of weather data through external communication, for example by virtue of the Internet,
  video images, for example by the camera 22 toward the front of the vehicle,
  speed of the vehicle, for example by the conventional incorporated speed measurement system or by virtue of the GPS system.

These data are supplied by means such as, for example, sensors, internal or external measurement systems, etc., such as those previously indicated by way of example, which are grouped together in FIG. 2 under the reference 40. This list of data is nonlimiting and the system can recover other types of data useful for assessing the external brightness in front of the vehicle and beyond the image 16 displayed by the display 36.

Using all or some of these data, the means 32 for assessing brightness assess the brightness in front of the vehicle and beyond the image 16 displayed. The various data collected are transmitted to the means 34 for determining the brightness setpoint to be displayed. The determination means 34 comprise a microcontroller 42 which recovers the data from the various means 32 for assessing brightness (sensors, measurement instruments, etc.). The data are then processed by a program of the microcontroller 42 to deduce therefrom a brightness setpoint to be transmitted to the display 36.

To improve the determination of the brightness setpoint, the determination means 34 comprise an illumination scene database 44, comprising data representative of illumination situations. The system thus makes a comparison of the current situation assessed by the means 32 for assessing brightness and existing situations prestored in the database 44. The system can thus store new situations by learning. The database 44 can also comprise geolocated data, for example comprising situations that the vehicle encounters in the context of normal and regular trips by the driver.

By way of example, the control system can make it possible to anticipate the following illumination situations by virtue of the combination of the data from the preceding list and the preceding brightness sensors:
  the geolocation data indicate the future passage of a vehicle into a tunnel, or the future exit from this tunnel, and, knowing the speed of the vehicle, the system knows when the vehicle will pass into the tunnel and determines the brightness setpoint to be transmitted to the display 36 at the moment of this passage. The arrival of the tunnel is confirmed/denied by the external brightness sensor 18 and/or the camera 22,
  the weather data (RLT sensor and external data) indicate the presence of snow, the value of the brightness setpoint is increased to increase the legibility of the display of the image 16 on the display 36,
  etc.

Once the brightness setpoint is determined by the determination means 34, said brightness setpoint is transmitted to the display 36 which therefore modifies the brightness of the image displayed 16 accordingly. The image 16 can then be seen by the driver 38 with the brightness automatically determined by the determination means 34. This interaction is represented by the dotted line arrow 46.

Nevertheless, this automatically determined brightness may not totally correspond to a comfortable situation for the driver 38. To improve the comfort of the driver 38 of the vehicle, the system therefore includes the means 26 for manually adjusting the brightness described previously, that the driver 38 can actuate. This adjustment action is represented by the dotted line arrow 48. This manual adjustment means 26 comprises two elements for two different functions.

The rotary thumbwheel 28 makes it possible to perform a fine adjustment of the brightness around the brightness setpoint value initially determined by the determination means 34. Thus, the manual setpoint does not replace the automatic determination of the brightness setpoint. This adjustment simply makes it possible for the driver 38 to slightly adapt the brightness according to his or her personal visual response and his or her comfort, which may be variable over time, from day to day, or as a function, for example, the eye strain of the driver 38. In other words, this manual fine adjustment makes it possible to shift the point of comfort from the brightness setpoint. This shift is recorded and applied to all the brightness setpoint values encountered over time, in order to retain a match with the visual response of the driver 38, until the driver 38 once again changes the manual setting or this setting is reset to zero for any other reason.

The switch 30, here in the form of a pushbutton, enables the driver 38 to switch from a normal mode of operation of the display 36 to a discrete mode.

The normal mode of operation of the display 36 presents a normal brightness, corresponding to the brightness setpoint determined by the determination means 34 as a function of the brightness assessed by the assessment means 32 (by taking into account, if necessary, the fine manual adjustment described previously). The display 36 displays an image 16 comprising a multitude of information, such as the speed, GPS information, mileage, etc., which is integrated by the driver of the vehicle and which can, if necessary, be the subject of various parameterizations by the driver 38.

The discrete mode of operation of the display 36 presents a lower brightness than the normal mode, and/or a reduced quantity of information displayed on the image 16, such as, for example, only the speed and emergency messages. That makes it possible for the driver 38, if he or she is disturbed by the image 16 or if he or she does not feel the need to see this image 16 displayed, to deactivate many of the functionalities of the display 36 quickly while retaining the most important information.

The invention claimed is:

1. A brightness control system for a head-up display of a vehicle, said head-up display displaying an image according to a brightness setpoint, said system comprising:
    means for assessing brightness; and
    means for determining the brightness setpoint intended for the display of the image on said head-up display, the means for determining the brightness setpoint being linked to the means for assessing brightness,
    wherein:
        said means for assessing brightness comprise:
            a first external brightness sensor that assesses an external brightness toward a front of the vehicle and beyond the image displayed on the head-up display,
            a second external brightness sensor that assesses an external brightness in an upward direction relative to the vehicle,
            an internal brightness sensor measuring a brightness inside the vehicle in proximity to a driver of the vehicle, and
            a display brightness sensor measuring a brightness of the image displayed by the head-up display,
        wherein:
            said first external brightness sensor is either a first photodetecting diode and an optical system or an external camera, arranged so as to be in a same field of view as the head-up display, to receive incident light in a cone whose intersection with a plane of the image displayed on the head-up display covers substantially all of the displayed image,
            said second external brightness sensor is a second photodetecting diode placed under a translucent dome that measures a diffuse light, and
            said internal brightness sensor is a camera,
        wherein:
            said means for determining the brightness setpoint automatically:
                determine the brightness setpoint as a function of the assessed external brightness toward the front of the vehicle and beyond the image displayed on the head-up display, the assessed external brightness in the upward direction relative to the vehicle, the measured brightness inside the vehicle in proximity to the driver of the vehicle, the measured brightness of the image displayed by the head-up display, and data supplied by a plurality of systems characterizing an environment of the vehicle, and
                set the brightness setpoint for the head-up display according to the brightness setpoint determined by said means for determining the brightness setpoint.

2. The brightness control system as claimed in claim 1, wherein the first external brightness sensor is arranged so as to receive the incident light in a cone at an angle of approximately 10° whose intersection with the plane of the image covers substantially all of the image.

3. The brightness control system as claimed in claim 1, wherein the means for assessing brightness are linked to the plurality of systems that include means for supplying one or more of the following types of data:
    absence/presence of rain,
    geolocation,
    time of day,
    weather conditions,
    video images,
    speed of the vehicle.

4. The brightness control system as claimed in claim 1, further comprising an illumination scene database, said database comprising data representative of different illumination situations.

5. The brightness control system as claimed in claim 1, further comprising:
    a manual brightness adjustment means controlled by the driver of the vehicle, and configured to allow a fine adjustment by the driver of the brightness setpoint of the head-up display around an initial brightness setpoint value determined by the means for determining the brightness setpoint.

6. The brightness control system as claimed in claim 5, wherein the manual adjustment means comprises:
    a switch that, following an activation thereof by the driver, significantly reduces the brightness setpoint value and/or reduces a quantity of information displayed on the head-up display and, following a deactivation thereof, restores the initial brightness setpoint value and the quantity of information displayed on the head-up display.

7. A head-up display, further comprising a brightness control system as claimed in claim 1.

8. A method for controlling brightness of a head-up display of a vehicle, said head-up display displaying an image according to a brightness setpoint, the method comprising:
    assessing an external brightness, and
    determining the brightness setpoint intended for the display of the image on said head-up display,
    wherein:
        assessing the external brightness comprises:
            a first external brightness sensor assessing an external brightness toward a front of the vehicle and beyond the image displayed on the head-up display,
            a second external brightness sensor assessing an external brightness in an upward direction relative to the vehicle,
            an internal brightness sensor measuring a brightness inside the vehicle in proximity to a driver of the vehicle, and
            a display brightness sensor measuring a brightness of the image displayed by the head-up display,
        wherein:
            said first external brightness sensor is either a first photodetecting diode and an optical system or an external camera, arranged so as to be in a same field of view as the head-up display, that receives incident light in a cone whose intersection with a plane of the image displayed on the head-up display covers substantially all of the displayed image, said second external brightness sensor is a second photodetecting diode placed under a translucent dome that measures a diffuse light, and said internal brightness sensor is a camera, determining the brightness setpoint for the head-up display as a function of the external brightness assessed toward the front of the vehicle and beyond the image displayed on the head-up display, the external brightness assessed in the upward direction relative to the vehicle, the measured brightness inside the vehicle in proximity to the driver of the vehicle, the measured brightness of the image displayed by the head-up display, and data supplied by a plurality of systems characterizing an environment of the vehicle; and setting said brightness setpoint for said head-up display according to the determined brightness setpoint.

9. A brightness control system for a head-up display of a vehicle, said head-up display displaying an image according to a brightness setpoint, said system comprising:

means for assessing brightness; and means for determining the brightness setpoint intended for the display of the image on said head-up display, the means for determining the brightness setpoint being linked to the means for assessing brightness, wherein:

said means for assessing brightness comprise:

a first external brightness sensor that assesses an external brightness toward a front of the vehicle and beyond the image displayed on the head-up display, a second external brightness sensor that assesses an external brightness in an upward direction relative to the vehicle, an internal brightness sensor measuring a brightness inside the vehicle in proximity to a driver of the vehicle, a display brightness sensor measuring a brightness of the image displayed by the head-up display, and a camera placed on a windshield of the vehicle and used to obtain a video image that recovers a multitude of data, wherein:

said first external brightness sensor is either a first photodetecting diode and an optical system or an external camera, arranged so as to be in a same field of view as the head-up display, to receive incident light in a cone whose intersection with a plane of the image displayed on the head-up display covers substantially all of the displayed image, said second external brightness sensor is a second photodetecting diode placed under a translucent dome that measures a diffuse light, and said internal brightness sensor is a camera, and wherein:

said means for determining the brightness setpoint automatically:

determine the brightness setpoint as a function of the assessed external brightness toward the front of the vehicle and beyond the image displayed on the head-up display, the assessed external brightness in the upward direction relative to the vehicle, the measured brightness inside the vehicle in proximity to the driver of the vehicle, the measured brightness of the image displayed by the head-up display, and the multitude of data recovered by the camera placed on the windshield of the vehicle, and set the brightness setpoint for the head-up display according to the brightness setpoint determined by said means for determining the brightness setpoint.

10. The brightness control system as claimed in claim 9, wherein the system anticipates following illumination situations based on the multitude of data recovered.

11. The brightness control system as claimed in claim 9, further comprising an illumination scene database, said database comprising data representative of different illumination situations.

12. The brightness control system as claimed in claim 11, wherein the scene database is automatically updated based on driving habits of the driver of the vehicle.

13. The brightness control system as claimed in claim 9, wherein the means for assessing brightness are linked to a plurality of systems that include means for supplying the following types of data:

absence/presence of rain,
geolocation,
time of day,
weather conditions,
video images, and
speed of the vehicle.

* * * * *